G. RENTSCHLER.
TRIP BALE HOOK.
APPLICATION FILED DEC. 7, 1910.
986,644.
Patented Mar. 14, 1911.
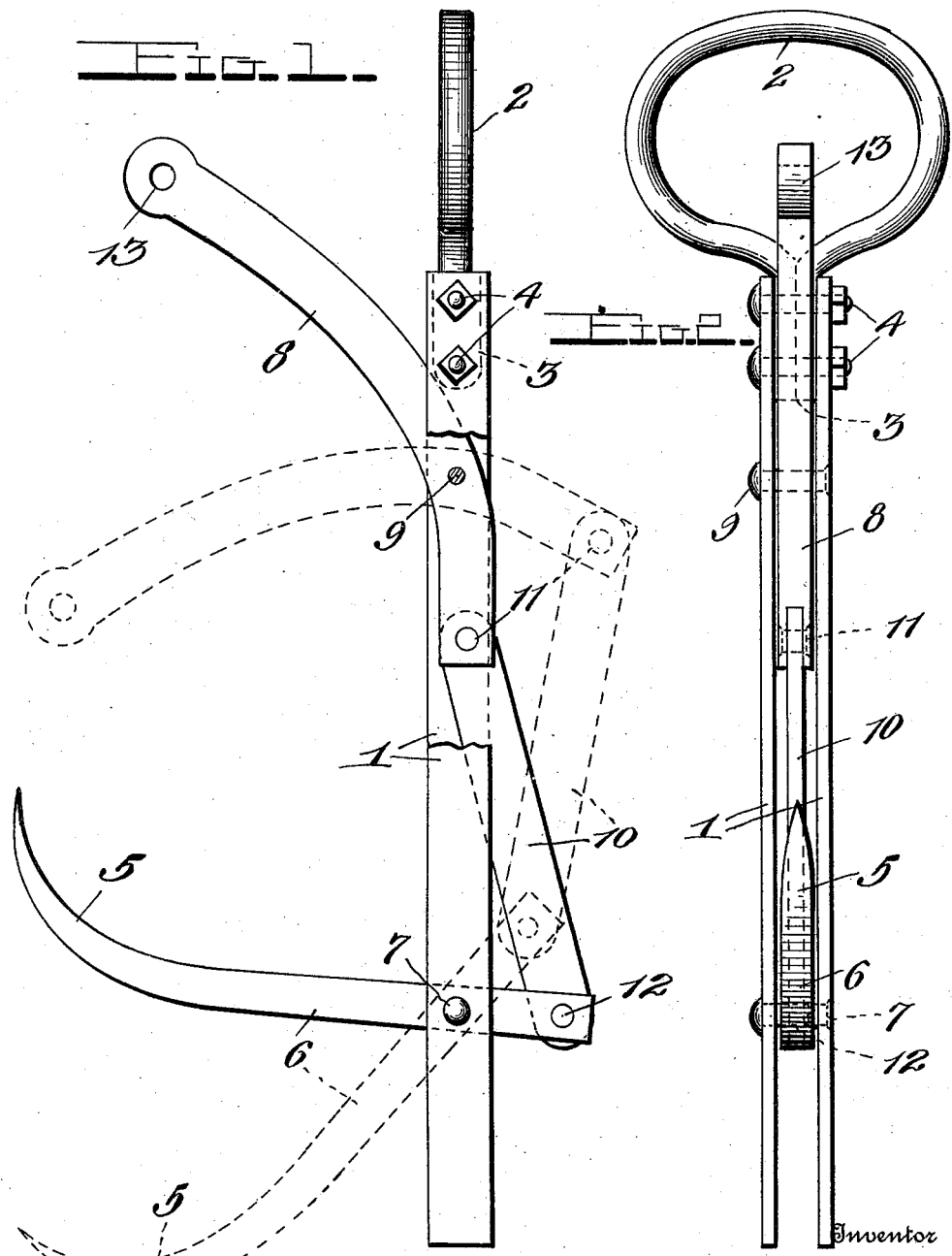
Witnesses
Chas. L. Griesbauer
M. F. Reeder
Inventor
G. Rentschler,
By Watson E. Coleman.
Attorney

UNITED STATES PATENT OFFICE.

GEORGE RENTSCHLER, OF CHESTER TOWNSHIP, LOGAN COUNTY, ILLINOIS.

TRIP BALE-HOOK.

986,644. Specification of Letters Patent. Patented Mar. 14, 1911.

Application filed December 7, 1910. Serial No. 596,111.

*To all whom it may concern:*

Be it known that I, GEORGE RENTSCHLER, a citizen of the United States, residing in Chester township, in the county of Logan and State of Illinois, have invented certain new and useful Improvements in Trip Bale-Hooks, of which the following is a specification, reference being had to the accompanying drawings.

My invention is an improved trip bale hook for handling baled hay, baled cotton and other baled commodities, the object of my invention being to provide an improved bale hook which comprises a hook element and means for releasing the same from the bale in order to facilitate the disengagement of the hook from the bale, the invention consisting in the construction, combination and arrangement of devices hereinafter described and claimed.

In the accompanying drawings—Figure 1 is partly an elevation and partly a sectional view of a trip bale hook constructed in accordance with my invention, Fig. 2 is an elevation of the same at right angles to Fig. 1.

The shank of my improved trip bale hook comprises a pair of straight metallic bars 1 of suitable dimensions. A handle 2 which is substantially in the form of an open ring or loop, has its arms or the doubled portions 3 formed by its ends, inserted between the upper ends of the shank bars 1, and secured thereto by bolts 4. Hence the said bolts not only secure the end portions of the handle together, but also secure said end portions between the upper ends of the shank bars, and connect the shank bars to the handle. The bill or hook element 5 which is curved toward the upper end of the bale hook is provided with an arm 6 which extends between the shank bars 1 and is pivotally mounted upon a rivet or other suitable device 7, which connects the shank bars together at a point a suitable distance from their lower ends. An operating lever 8 which is preferably curved as shown, is also pivotally mounted between the shank bars upon a rivet or other suitable pivotal device 9, which connects the said shank bars. A link 10 has its upper end pivotally connected as at 11 to the lower end of the lever 8, and its lower end pivotally connected as at 12 to the outer end of the arm 6 of the bill or hook element. The said lever is provided at its free end with an eye 13 to which an operating wire may be secured.

It will be observed upon reference to Fig. 1, of the drawings that when the bill or hook is extended at substantially right angles to the shank bars, the lever 8 bears against the inner end or side of the handle and hence the bill or hook element is held in the required position to enable it to be driven into the bale.

In order to release the bill to facilitate the disengagement of the bale hook from the bale, the lever 8 is moved to the position indicated in dotted lines in Fig. 1, said lever 8 through the instrumentality of the link 10, disposing the bill substantially in line with the shank of the device, and hence enabling the bill to be readily drawn from the bale.

I claim:—

1. The herein described bale hook comprising a shank portion having a stop device near its upper end, a bill having an arm pivotally connected to the shank portion, the rear end of the said arm when the same is at right angles to the shank portion extending from the opposite side of the shank from that from which the said bill extends, an operating lever pivotally connected to the shank, adapted when moved in one position to bear against the said stop element of the shank, and a link pivotally connected to the lower end of the operating lever, and also to the outer end of the arm of said bill.

2. The herein described trip bale hook comprising a pair of shank bars, a handle having a portion secured between the upper ends of said shank bars, and spacing them apart, said portion of the handle forming a stop element, an operating lever pivotally mounted between the shank bars, and adapted when moved in one direction to engage the said stop element, an arm pivotally connected at a point intermediate its ends between the lower portions of the shank bars, said arm having a bill or hook element at one end thereof, and a link pivotally connected at its lower end to the end of said arm opposite said bill, the upper end of the said link being pivotally connected to the lower end of the said operating lever.

In testimony whereof I hereunto affix my signature in the presence of two witnesses.

GEORGE RENTSCHLER.

Witnesses:
MATTHEW RENTSCHLER,
J. H. ANSTINE.